493-102 SR
FIP8608 OR T 857,045

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 24, 1968

857 O.G. 1039

663,321

BOX FLAP PRESSER FOOT FOR BALING FIBERS

Richard Owen White, Waynesboro, Va., assignor to E. I. du Pont de Nemours and Company, Wilmington, Del., a corporation of Delaware Filed Aug. 25, 1967. Published Dec. 24, 1968
Class 53—124 (E)
1 Sheet Drawing. 2 Pages Specification

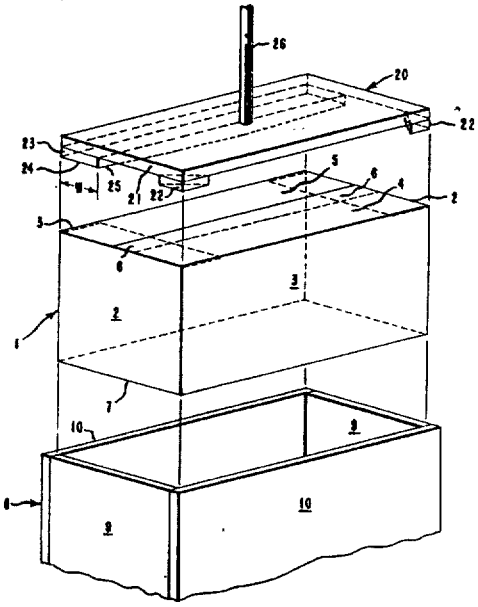

An improvement in apparatus for baling staple fibers comprising a bale chamber (8) into which a box bottom is placed, means for compressing the fibers into the box bottom in the bale chamber, means for inserting a box cover having a top with separable upper and lower flaps into the bale chamber with a box pusher foot (20) and means for closing the box cover and box together to package the bale of staple fiber is provided. The improvement comprises means, such as abutments (22, 23) on the pressure face of said pusher foot, for depressing the lower flap (5) of the box cover with respect to the upper flap (4) thereof while the box cover is being inserted in the bale chamber. The improved means permits air within the box cover and bale chamber to flow out through the top of the box cover thereby reducing wastage of fiber due to violent gusts of air which otherwise would blow through the cracks in the baler doors. Incidence of damage to the box cover is also reduced. While being inserted in the bale chamber by the pusher foot, the box cover is aligned by spring-loaded protruding plates which permit sliding downward passage.

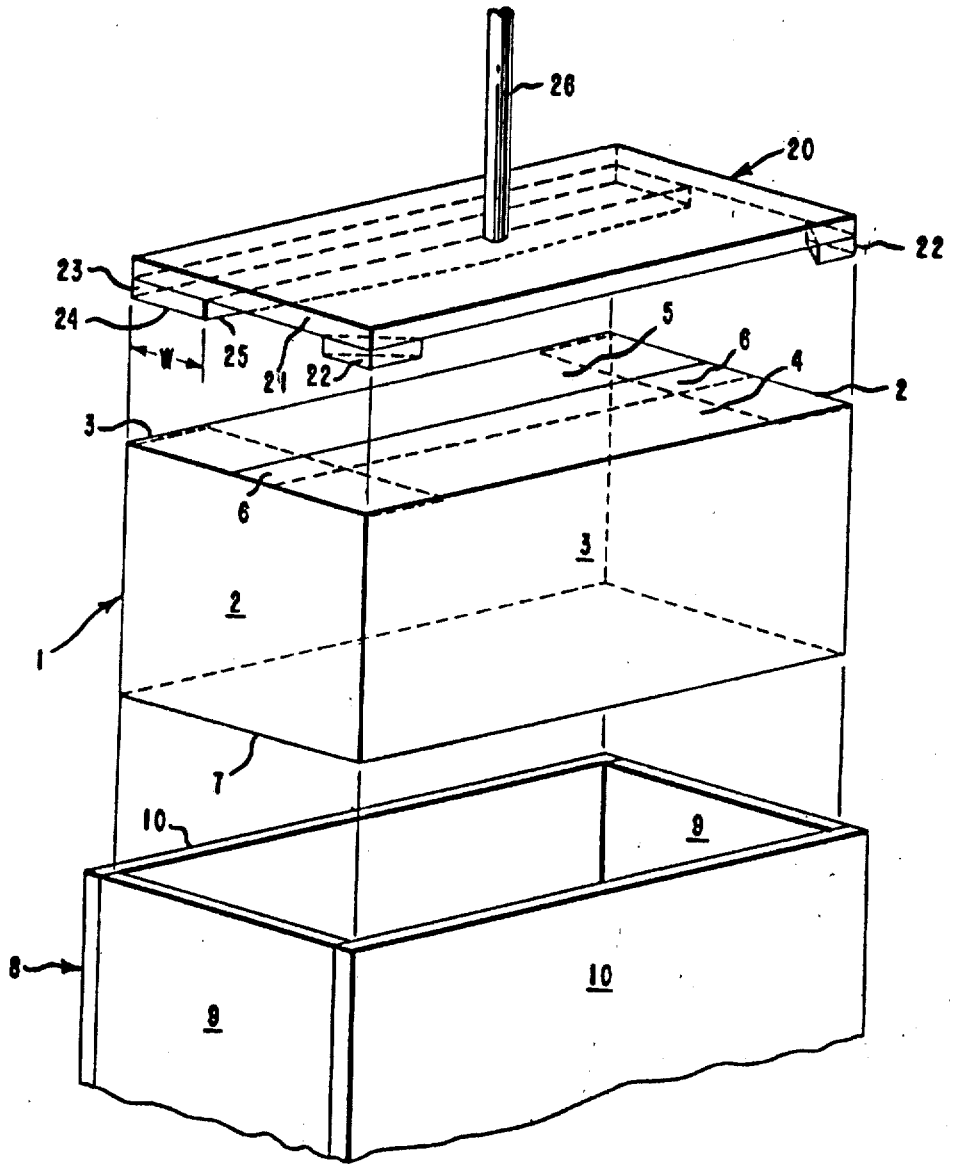
INVENTOR
RICHARD OWEN WHITE
BY Eugene Berman
AGENT